(12) United States Patent
Lee et al.

(10) Patent No.: US 9,438,553 B2
(45) Date of Patent: *Sep. 6, 2016

(54) SYSTEM AND METHOD FOR IMPLEMENTING A SUBSCRIPTION-BASED SOCIAL MEDIA PLATFORM

(71) Applicant: REMOTE MEDIA, LLC, Wheaton, IL (US)

(72) Inventors: Ray Lee, Martina Del Ray, CA (US); Jeffrey Shaun King, Atlanta, GA (US); Vincent Tuscano, Santa Monica, CA (US)

(73) Assignee: REMOTE MEDIA, LLC, Wheaton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,347

(22) Filed: Jul. 7, 2015

(65) Prior Publication Data

US 2015/0312205 A1 Oct. 29, 2015

Related U.S. Application Data

(63) Continuation of application No. 14/319,423, filed on Jun. 30, 2014, now Pat. No. 9,094,362, which is a continuation of application No. 14/184,508, filed on Feb. 19, 2014, now Pat. No. 8,769,031, which is a continuation-in-part of application No. 14/025,523, filed on Sep. 12, 2013, now Pat. No. 8,667,075.

(60) Provisional application No. 61/811,958, filed on Apr. 15, 2013.

(51) Int. Cl.
*G06F 15/16* (2006.01)
*H04L 12/58* (2006.01)
*G06Q 10/10* (2012.01)
*G06Q 50/00* (2012.01)
*H04L 29/06* (2006.01)
*H04L 29/08* (2006.01)
*H04N 21/2187* (2011.01)
*H04N 21/231* (2011.01)
*H04N 21/233* (2011.01)
*H04N 21/4223* (2011.01)
*H04W 4/14* (2009.01)
*H04N 21/61* (2011.01)

(52) U.S. Cl.
CPC ............. *H04L 51/32* (2013.01); *G06Q 10/107* (2013.01); *G06Q 50/01* (2013.01); *H04L 51/04* (2013.01); *H04L 51/046* (2013.01); *H04L 65/403* (2013.01); *H04L 67/26* (2013.01); *H04N 21/2187* (2013.01); *H04N 21/231* (2013.01); *H04N 21/2335* (2013.01); *H04N 21/4223* (2013.01); *H04W 4/14* (2013.01); *H04N 21/6125* (2013.01); *H04N 21/6175* (2013.01)

(58) Field of Classification Search
None
See application file for complete search history.

(56) References Cited

U.S. PATENT DOCUMENTS 5,694,163 A 12/1997 Harrison
8,244,822 B1 8/2012 Lowry et al.
(Continued)

*Primary Examiner* — Brian P Whipple

(57) ABSTRACT

Systems and methods for implementing a subscription-based social media or fan club platform are provided. A content creator generates live content on a mobile device and sends requests to a server for initializing a live stream from the mobile device. The server sends requests to encoding service providers. The encoded live content is send to a content storage server. Subscribers of the social media or fan club platform can access the live content on their mobile devices from the content storage server.

13 Claims, 14 Drawing Sheets

(56) References Cited

U.S. PATENT DOCUMENTS

| | | |
|---|---|---|
| 8,296,380 B1 | 10/2012 | Kelly et al. |
| 8,386,340 B1 | 2/2013 | Feinstein |
| 8,429,189 B1 | 4/2013 | Spielberg et al. |
| 8,438,246 B2 | 5/2013 | Alnas |
| 8,554,855 B1 | 10/2013 | Lowry et al. |
| 8,589,992 B2 | 11/2013 | Babic |
| 8,667,075 B1 | 3/2014 | King et al. |
| 8,769,031 B1 | 7/2014 | Lee et al. |
| 2003/0046189 A1 | 3/2003 | Asayama |
| 2010/0174789 A1 | 7/2010 | Pena et al. |
| 2011/0041140 A1 | 2/2011 | Harm et al. |
| 2011/0041171 A1 | 2/2011 | Burch et al. |
| 2011/0055333 A1 | 3/2011 | Guy et al. |
| 2011/0161754 A1 | 6/2011 | Baptist et al. |
| 2011/0296473 A1 | 12/2011 | Babic |
| 2011/0296474 A1 | 12/2011 | Babic |
| 2011/0320550 A1 | 12/2011 | Lawson et al. |
| 2012/0066348 A1 | 3/2012 | Alnas |
| 2012/0096093 A1 | 4/2012 | Bouw et al. |
| 2012/0096103 A1 | 4/2012 | Xun et al. |
| 2012/0311049 A1 | 12/2012 | Johansson et al. |
| 2013/0010333 A1 | 1/2013 | Anand et al. |
| 2013/0081128 A1 | 3/2013 | Gupta et al. |
| 2013/0157624 A1 | 6/2013 | Talwar et al. |
| 2013/0157626 A1 | 6/2013 | Talwar et al. |
| 2013/0157627 A1 | 6/2013 | Talwar et al. |
| 2013/0157699 A1 | 6/2013 | Talwar et al. |
| 2013/0179488 A1 | 7/2013 | Wang et al. |
| 2013/0212215 A1 | 8/2013 | Ukkola et al. |
| 2013/0290441 A1 | 10/2013 | Linden Levy |
| 2013/0290444 A1 | 10/2013 | Billings et al. |
| 2014/0033265 A1 | 1/2014 | Leeds et al. |
| 2014/0047025 A1 | 2/2014 | Jones et al. |

SYSTEM AND METHOD FOR IMPLEMENTING A SUBSCRIPTION-BASED SOCIAL MEDIA PLATFORM

CROSS-REFERENCE TO RELATED APPLICATIONS

This application is a continuation of and claims the benefit under 35 U.S.C. §120 of U.S. patent application Ser. No. 14/319,423, filed on Jun. 30, 2014, entitled "System and Method for Implementing a Subscription-Based Social Media Platform," which is a continuation of and claims the benefit under 35 U.S.C. §120 of U.S. patent application Ser. No. 14/184,508, filed on Feb. 19, 2014, now U.S. Pat. No. 8,769,031, entitled "System and Method for Implementing a Subscription-Based Social Media Platform," which is a continuation-in-part of and claims the benefit under 35 U.S.C. §120 of U.S. patent application Ser. No. 14/025,523, filed on Sep. 12, 2013, now U.S. Pat. No. 8,667,075, entitled "System and Method for Implementing a Subscription-Based Social Media Platform," the contents of which are incorporated herein by reference in their entirety, which claims priority under 35 U.S.C. §119(e) to U.S. Provisional Patent Application No. 61/811,958, filed on Apr. 15, 2013, entitled "Subscription-Based Social Media Platform," the contents of which are hereby incorporated by reference in their entirety.

FIELD OF THE INVENTION

The present invention relates to computer-based systems and methods for providing a subscription-based social media or digital fan club platform.

BACKGROUND OF THE INVENTION

Social media and digital fan club platforms utilize mobile and web-based technologies to create highly interactive environments through which individuals and communities share, co-create, discuss, and modify user-generated content. However, some social media and digital fan club platforms limit the way by which a user can share content. For example, some social media and digital fan clubs do not incorporate email, instant messaging (IM), phone calls, or live video feeds in their supported technologies.

SUMMARY

The present invention is directed to systems and methods for implementing a subscription-based social media or digital fan club platform. The disclosed system includes a robust subscription-based publishing platform that enables sharing of premium content in one place, for example, photos, videos, instant messaging (IM), short message service (SMS) messages, email, phone calls, live videos, and more, using an application (app) running on a mobile device. By using the disclosed systems and methods, influential people and brands in the world can connect directly with their most devoted fans, thereby building a true community.

A method for implementing a subscription-based social media or digital fan club platform is provided. The method includes receiving from at least one of a computer and a mobile device of a content creator, a first REpresentational State Transfer (REST) application programming interface (API) request for initiating a chat, the API request generated by an application running on the at least one of a computer and a mobile device of the content creator. The method also includes retrieving at least one of mobile numbers and mobile device IDs of users of the fan club platform, determining a plurality of valid subscribers, and retrieving from a database information about the plurality of valid subscribers. The method further includes (a) sending to an SMS message service provider a second REST API request, information about the plurality of subscribers, and SMS content from the content creator, if the second REST API request is a request to an SMS message service provider, and/or (b) sending to a PUSH Notification service provider a third REST API request, information about the plurality of subscribers, and PUSH Notification content from the content creator, if the third REST API request is a request for a PUSH Notification.

Under alterative embodiments, a method for implementing a subscription-based fan club platform includes receiving from at least one of a computer and a mobile device of a content creator, a REST API request, the API request generated by an application running on the at least one of a computer and a mobile device of the content creator and indicating that the content creator can participate in a chat. The method also includes receiving from at least one of a user computer and a user mobile device at least one request by a user to participate in the chat and determining whether the user is a subscribed user. The method further includes (a) enabling the user to participate in the chat, if the user is a subscribed user and (b) enabling the user to have view-only access to the chat, if the user is not a subscribed user.

Under alterative embodiments, a method for implementing a subscription-based fan club platform includes receiving from at least one of a computer and a mobile device of a content creator, a REST API request, the API request generated by an application running on the at least one of a computer and a mobile device of the content creator and indicating a first number, wherein the first number is a number of users of the fan club platform that can enter a chat room with the content creator. The method also includes identifying users of the fan club platform that have indicated interest to enter the chat room with the content creator and determining whether the users of the fan club platform that have indicated interest to enter the chat room are subscribed users. The method further includes (a) selecting, among the subscribed users, the first number of users to enter the chat room, and (b) enabling the users that are not subscribed to have view-only access to the chat room.

Systems and methods for implementing subscription-based social media are provided. The disclosed system includes a robust subscription-based publishing platform that enables sharing of premium content in one place, for example, photos, videos, SMS messages, email, phone calls, live videos, and more, using an application (app) running on a mobile device. By using the disclosed systems and methods, influential people and brands in the world can connect directly with their most devoted fans, thereby building a true community.

A method for implementing a subscription-based social media platform is provided. The method includes the steps of receiving an application programming interface (API) request for initializing a live stream from a mobile device, the API request generated by an application running on the mobile device. The method also includes storing metadata information of the received API request in a database coupled to the server and sending a REpresentational State Transfer (REST) request to an encoding service provider, the REST request comprising a request for a plurality of bitrate Real Time Messaging Protocol ("RTMP") stream configurations. The method further includes receiving an RTMP protocol location from the encoding service provider, storing RTMP stream information in the database, sending the RTMP protocol location to the mobile device, receiving a first notification from the mobile device that the mobile device has initiated the live stream, and sending a second notification to the database that the mobile device has initiated the live stream.

Under alterative embodiments of the present invention, a method for implementing a subscription-based social media platform includes the steps of sending to a server an application programming interface (API) request for initializing a live stream, the API request generated by an application running on the mobile device, the API having metadata information being stored to a database and receiving a REpresentational State Transfer (REST) protocol location by the server, in response to an REST request to an encoding service provider, the REST request comprising a request for a plurality of bitrate Real Time Messaging Protocol ("RTMP") stream configurations. The method further includes the steps of sending a first notification to the server that the mobile device has initiated the live stream, encoding the live stream, generating packets of encoded live stream data from the encoded live stream, and sending the encoded live stream packets to an encoding service provider.

Under alterative embodiments of the present invention a method for implementing a subscription-based social media platform includes the steps of receiving from a content creator a REST API request for initializing at least one of an email, an SMS message, and a voice message and determining a plurality of subscribers with subscription to receive content from the content creator. The method further includes the steps of retrieving from a database information about the plurality of subscribers, and (a) sending to an email service provider the REST API request, information about the plurality of subscribers, and the content from the content creator, if the REST API request is a request for an email address, (b) sending to an SMS message service provider the REST API request, information about the plurality of subscribers, and the content from the content creator, if the REST API request is a request for an SMS message, and (c) if the REST API request is a request for a voice message, (1) sending to a content storage server an audio file corresponding to the content from the content creator, (2) sending to an encoding service provider the REST API request, and (3) sending to a voice service provider the REST API request, in response to notification from the encoding service provider that the audio file is encoded.

These and other embodiments will be described in greater detail in the remainder of the specification referring to the drawings.

DETAILED DESCRIPTION

The present invention is directed to systems and methods for implementing a subscription-based social media or digital fan club platform. The disclosed systems and methods build exclusive online communities for people of influence and their fans. The disclosed system includes a robust subscription-based publishing platform with more ways to share premium content in one place, for example, photos, videos, SMS messages, instant messaging, email, phone calls, live videos, and more, compared to existing platforms. By using the disclosed systems and methods, influential people and brands in the world can connect directly with their most devoted fans, by building a true community. Under an embodiment of the present invention the subscription-based platform is advertisement free and spam free.

Figure 1:
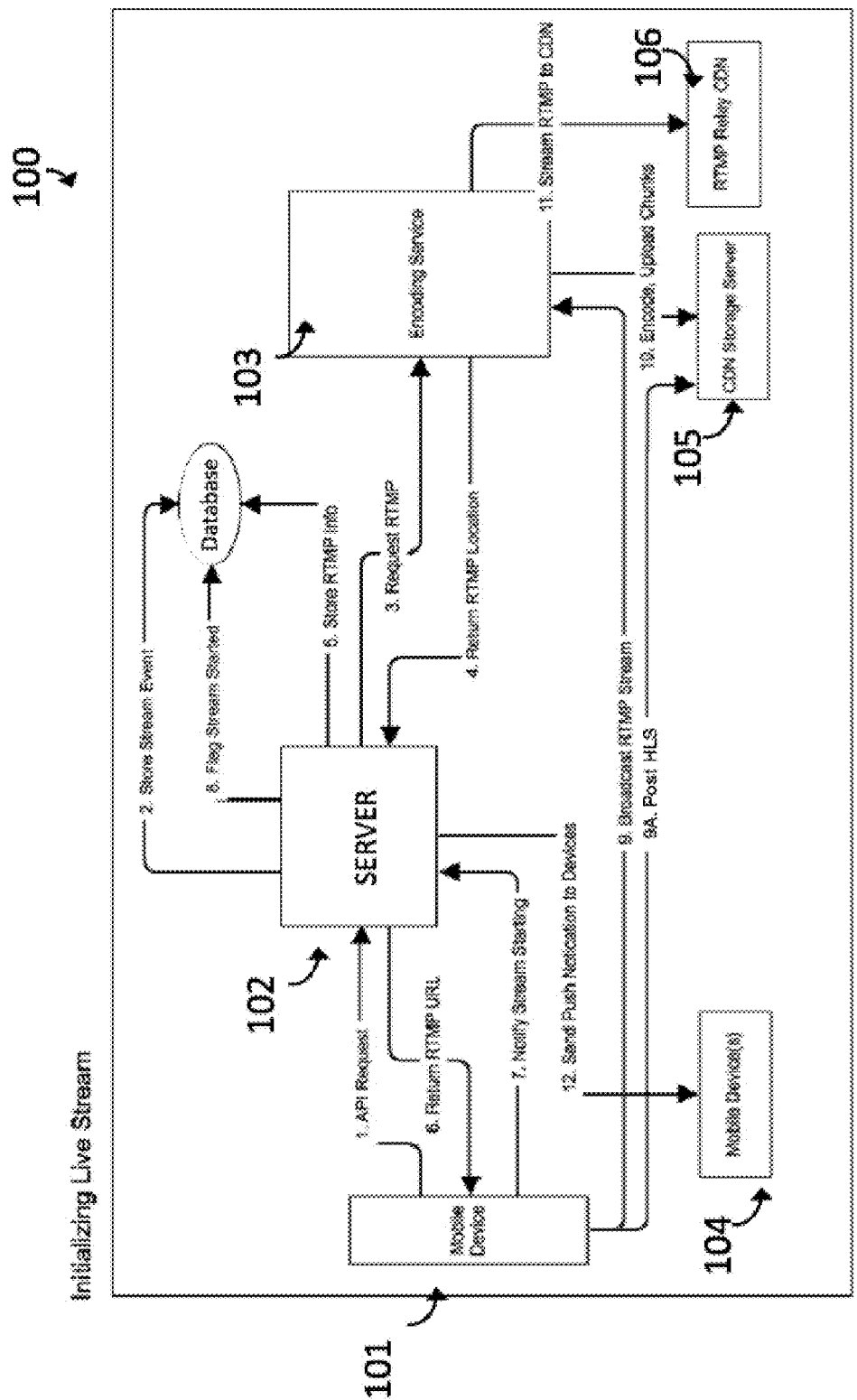
FIG. 1 shows a representative system for initializing a live stream originating from a mobile device according to aspects of the invention.
Figure 2:
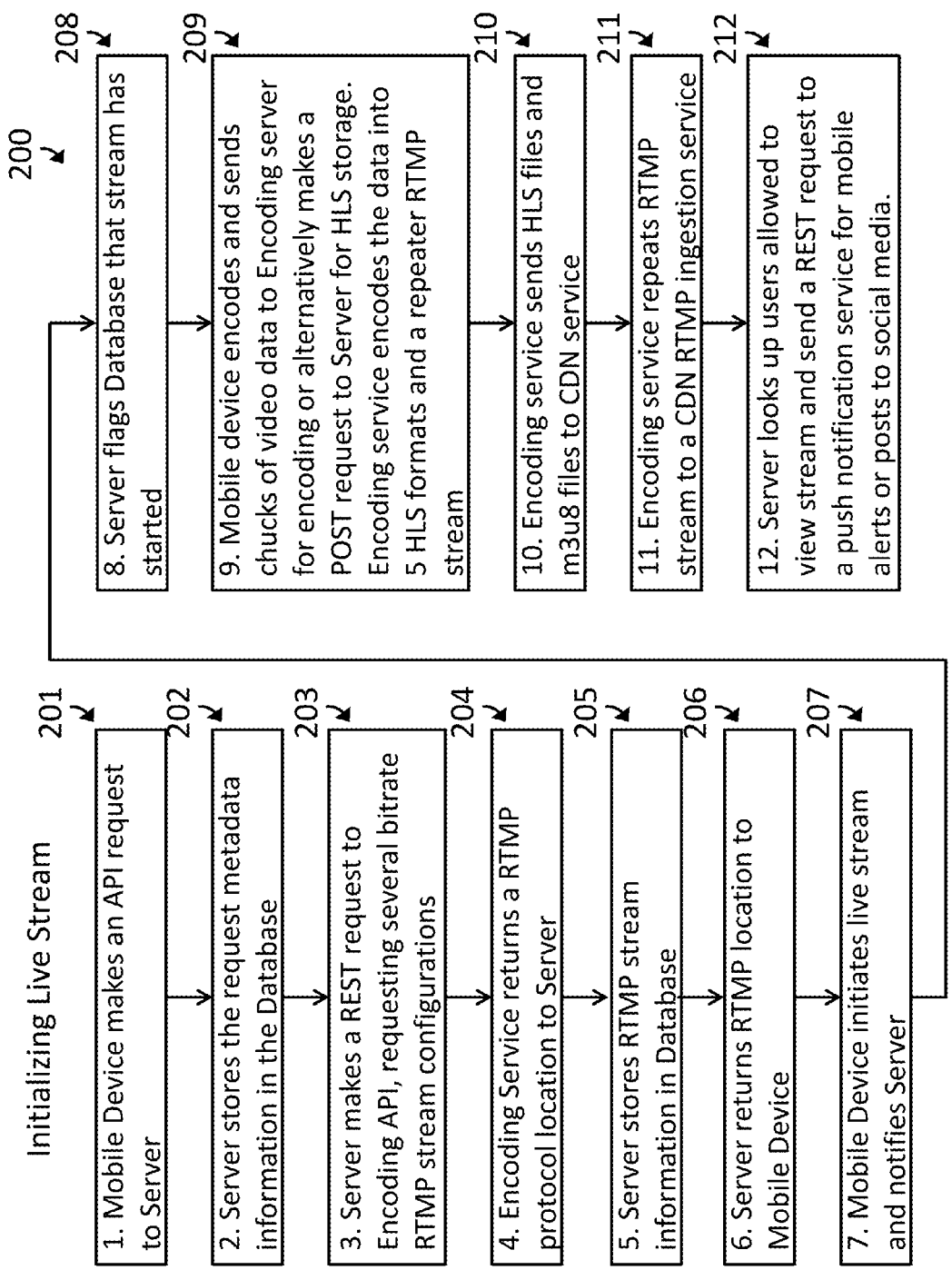
FIG. 2 shows exemplary steps for initializing a live stream from a mobile device according to aspects of the invention.

FIG. 1 shows a system 100 for initializing a live stream originating from a mobile device. An application running on the mobile device can facilitate capturing the live stream using one or more cameras of the mobile device. The live stream can be broadcasted and streamed to other mobile, tablet or computer devices, according to aspects of the disclosure. FIG. 2, generally at 200, discloses exemplary steps for initializing a live stream from a mobile device using an application running on the mobile device. In connection with FIGS. 1 and 2, an application or "app" running on a content source mobile device 101 makes an Application Programming Interface ("API") request to a server 102 (201), for initializing a live stream from the mobile device 101 using an application running on the mobile device. Server 102 stores the metadata information of the API request in a database 107 (202). In addition, server 102 makes a REpresentational State Transfer ("REST") request to an encoding service provider 103, requesting a plurality of bitrate Real Time Messaging Protocol ("RTMP") stream configurations 203.

The encoding service provider 103 returns an RTMP protocol location to the server 102 (204), and in response, the server 102 stores the RTMP stream information in the database (205) and returns the RTMP location to the mobile device 101 (206).

The app running on the mobile device 101 then initiates the live stream (207) and notifies the server 102 that there is a stream initiating. Server 102 then notifies the database 107, for example, using a flag, that the stream has initiated (208).

The app running on the mobile device 101 instructs the mobile device to start encoding and to send chunks of the video data to the encoding service provider 103 or alternatively makes POST request to server 102 for HTTP Live Streaming ("HLS") storage (209). The encoding service provider 103 encodes the video data into one or more streams. In addition, the encoding service provider 103, sends files, for example, HLS and/or m3u8 files, to a content delivery network ("CDN") 105 (210). The encoding service provider further repeats the RTMP stream to a CDN RTMP ingestion service 106 (211).

Server 102 looks up users who are subscribed to particular services and are allowed to view a stream from mobile, tablet or computer device 101, and then sends push notifications or SMS to one or more mobile devices 104 for alerting them about the live stream or post to social media, for example, Twitter or Facebook, alerting that the live stream (212).

Figure 3:
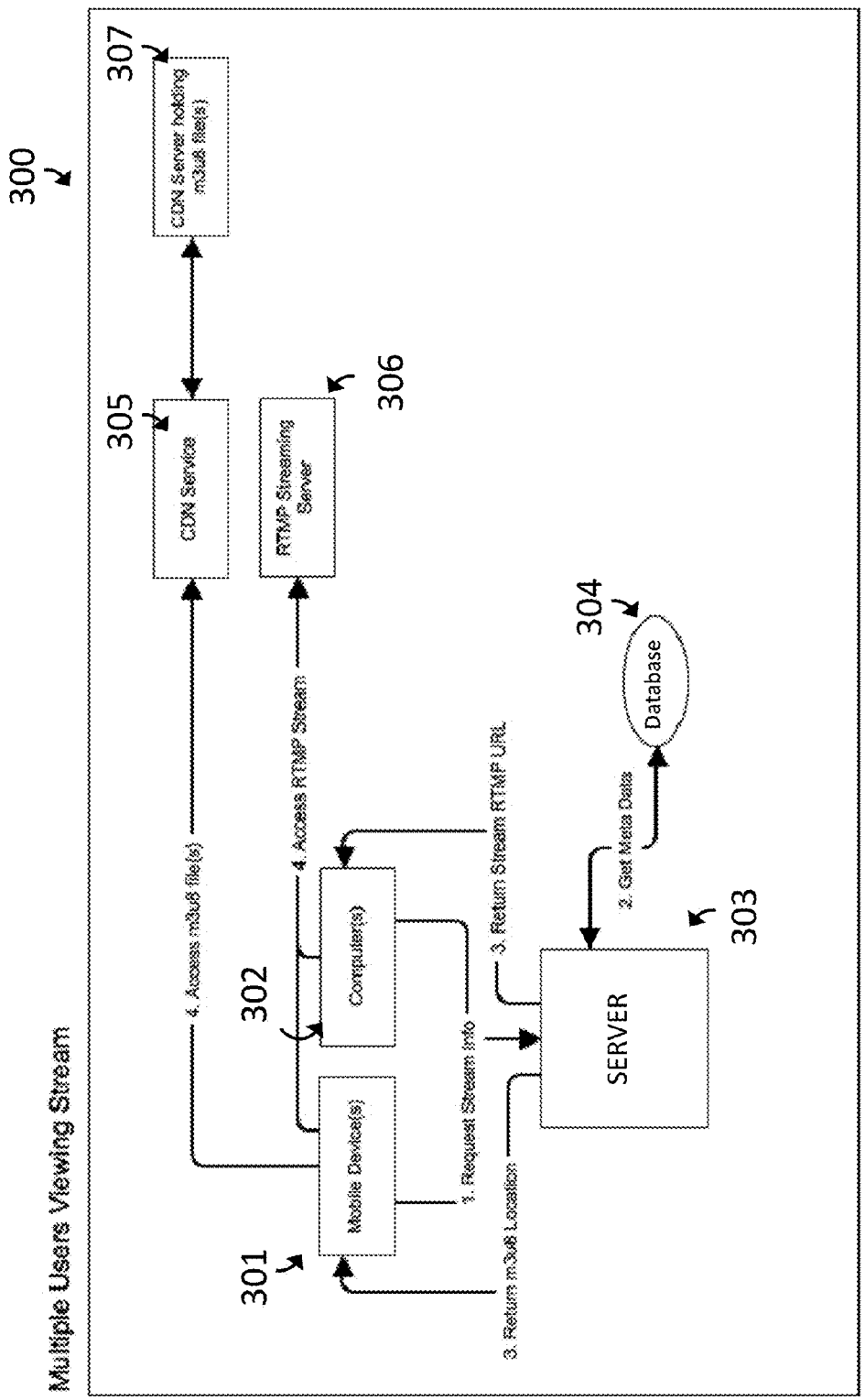
FIG. 3 shows a representative system for allowing multiple users to view a stream according to aspects of the invention.
Figure 4:
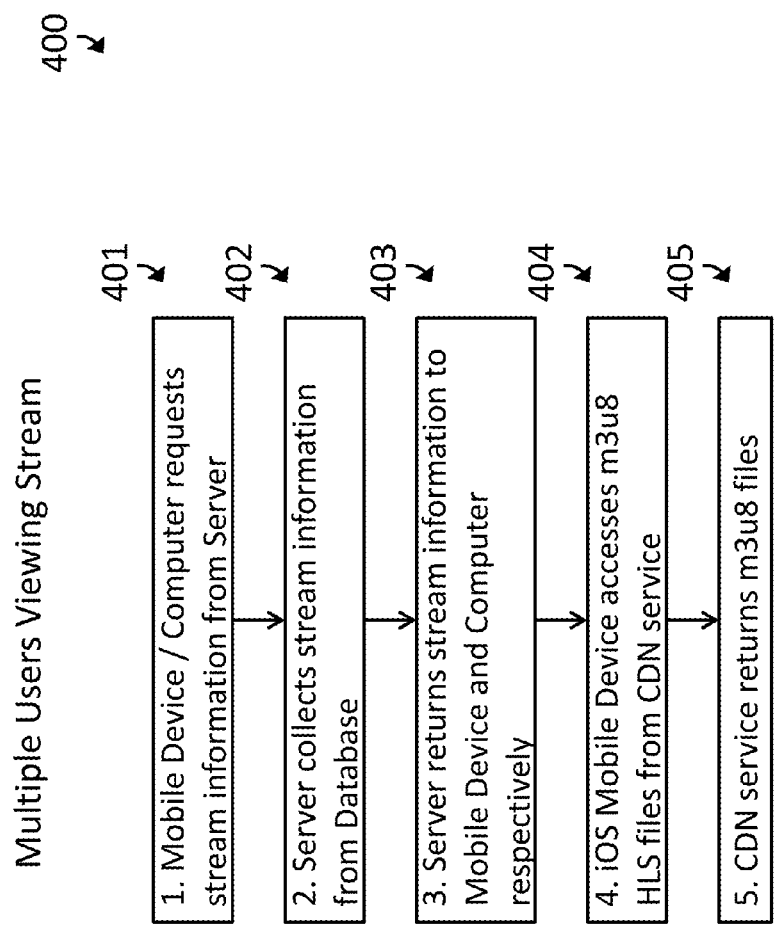
FIG. 4 shows a representative method for allowing multiple users to view a stream according to aspects of the invention.

FIGS. 3 and 4 show an exemplary system 300 and method 400 for allowing multiple users to view a stream, respectively. In connection with FIGS. 3 and 4, a request for stream information can originate from any device, for example, a mobile device 301, a personal computer 302, and a tablet (401). The user request is received by a server 303. After the server receives the request, the server collects stream information from a database 304 (402) and returns stream information to the user device (403). For example, the server can return a stream RTMP Universal Resource Location ("URL") to a computer or an m3u8 location to a mobile device. The user device can access the content from an RTMP 306 streaming server or a CDN service 305 coupled to a CDN Server 307 holding m3u8 files (404). Then the CDN service returns the m3u8 files to the mobile device (405).

Figure 5:
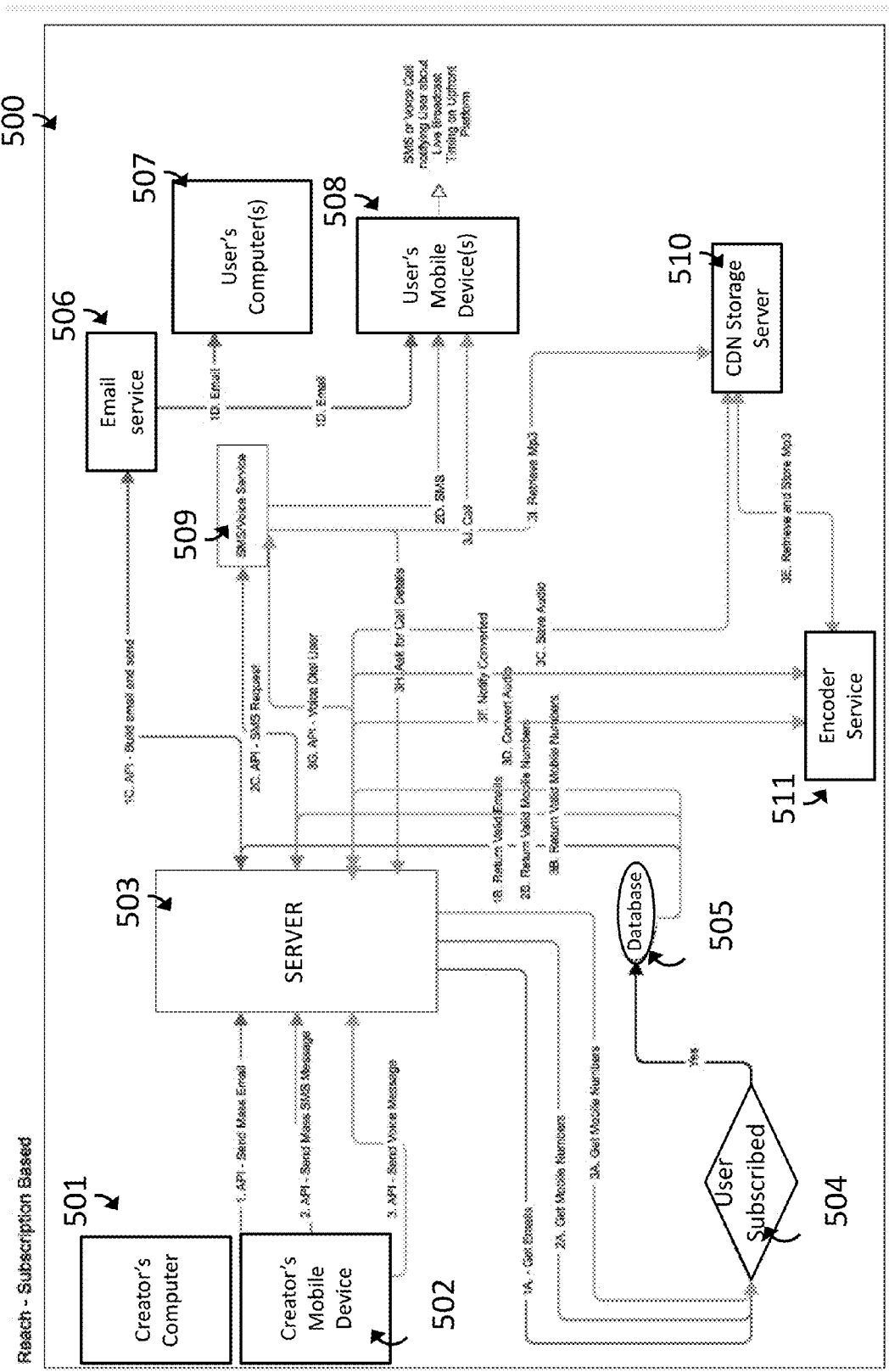
FIG. 5 shows a representative system for enabling a content creator using an app on a mobile device to reach a plurality of users subscribed to a particular service according to aspects of the invention.
Figure 6:
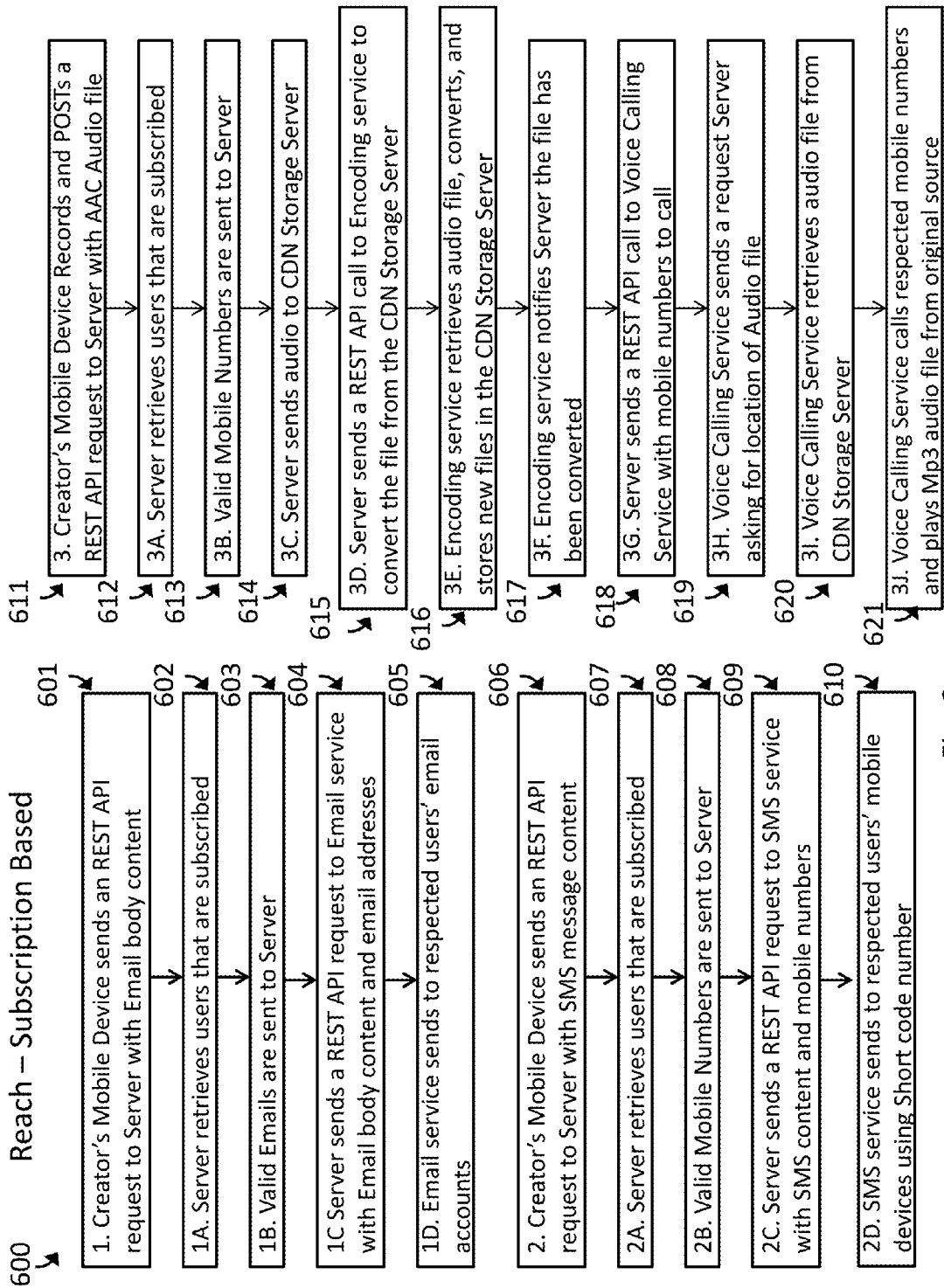
FIG. 6 shows a representative method for enabling a content creator using an app on a mobile device to reach a plurality of users subscribed to a particular service according to aspects of the invention.

FIGS. 5 and 6 show an exemplary system 500 and method 600, respectively, for enabling a content creator using an app on a mobile device to reach a plurality of users subscribed to a particular service.

The system 500 can reach particular users based on their geographic profile information, therefore allowing geo-targeting of users. When users subscribe to a particular service, they can specify geographic information, for example, their country, city of residence, zip code, or address. The disclosed system can use different technologies to reach a particular audience, based on user-provided geographic information. The disclosed systems and methods allow a content creator using an app running on their mobile device to connect to their members, for example, using an SMS message, a voice call directly to the recipients' phone, and/or an e-mail. For example, a content creator can:

1) Send a private SMS message only to those members located in California.

2) Send a private Voice Call to members located in New York, New Jersey, and Philadelphia.

3) Send a private SMS message to all of Europe

4) Send a private Email only to the members in the United States.

The targeted communication can be based on, for example, the zip code from the user's profile, and allows the content creator to geographically target exactly where to send each reach method.

FIGS. 5 and 6 show three different ways for reaching the plurality of users. A content creator can either create content on a computer 501 or a mobile device 502, using an application running on the computer or the mobile device. Under a first embodiment, the content creator app sends a REST API request to a server 503, with an email body content (601). The server retrieves user email addresses that are subscribed to a particular service or are subscribed to receive content from the particular content creator 504 (602). Valid email addresses are returned from a database 505 to the server 503 (603). Then the server 503 sends a REST API request to an email service provider 506 and also provides the email service provider 506 with the email body content and email addresses (604). In response, the email service provider sends emails with the received email body content to the received email addresses (605), which can be received at a user's computer 507 or mobile device 508.

Under an alternative embodiment, an app running on a creator's mobile device 502 sends an REST API request to a server 503, with SMS message content (606). The server 503 retrieves information on the users that are subscribed to receive content from the content creator 504 (607). A database 505 sends the mobile numbers of the subscribed users to the server 503 (608). In response, the server 503 sends a REST API request to an SMS service provider 509 with SMS content generated using the app running on the mobile device and the mobile numbers of the subscribed users (609). The SMS service provider 509 sends to the subscribed users' mobile devices an SMS notifying the users, for example, about a live broadcast from the content creator (610).

Under an alternative embodiment, an app running on a creator's mobile device 502 records and posts a REST API request to a server 503, with an audio file, for example, an AAC Audio file (611). The server 503 retrieves information from users that are subscribed to receive content from the particular creator 504 (612). A database sends mobile numbers of the subscribed users to the server (613). The server 504 sends the audio file to a CDN storage server 510 (614) and further sends a REST API call to an encoding service provider 511 to convert the audio file from the CDN storage server 510 (615).

In response, the encoding service provider 511 retrieves the audio file, converts it to one or more files and stores the new file(s) in the CDN storage server 510 (616). In addition, the encoding service provider 511 notifies the server 503 that the audio file has been converted (617). In response, the server sends a REST API call to a voice calling service 509 with a list of mobile numbers to be called (618).

The voice calling service 509 sends a request to the server 503 asking for a location of the audio file that is to be transmitted to subscribed users (619), and consequently, retrieves the audio file from the CDN storage server 510 (620). In addition, the voice calling service 509 calls the mobile numbers of the subscribers and plays the audio, for example, an mp3 file, from the original source (621).

Figure 7:
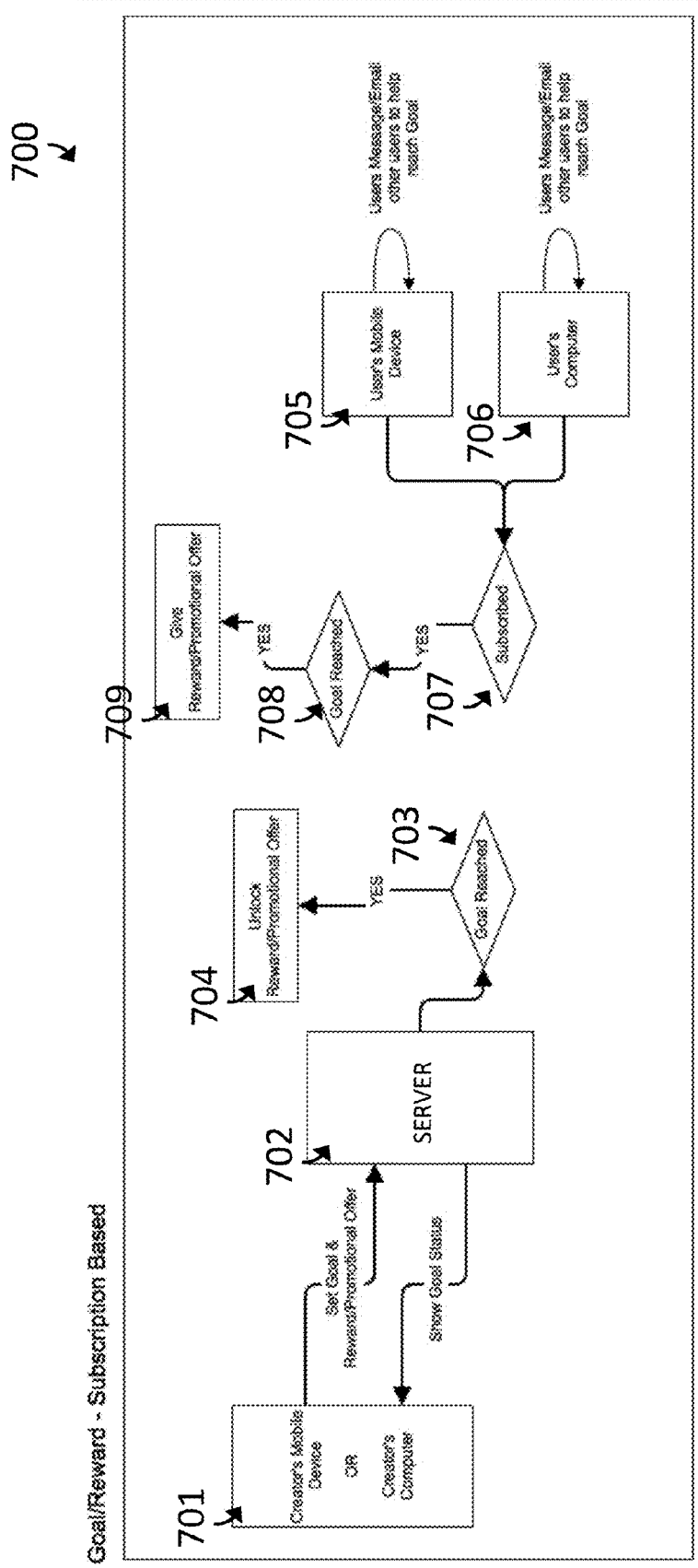
FIG. 7 shows a representative system for implementing a reward subscription program according to aspects of the invention.
Figure 8:
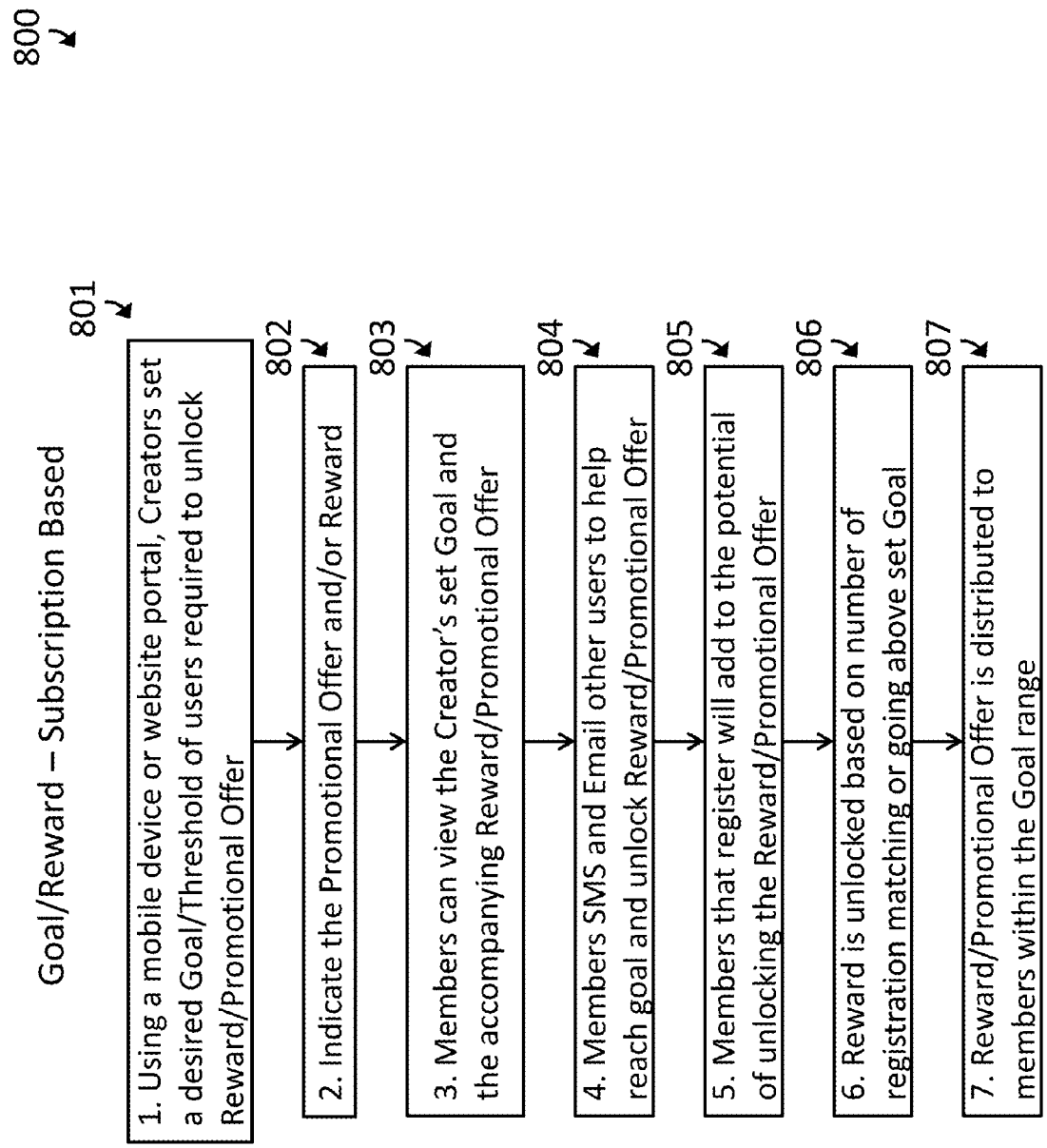
FIG. 8 shows a representative method for implementing a reward subscription program according to aspects of the invention.

FIGS. 7 and 8 show an exemplary system 700 and method 800, respectively, for implementing a goal/reward subscription program. In the system of 700, a creator of the reward program can use, for example, a mobile device 701 or website portal in a computer 701, to set a desired goal or threshold that users are required to meet to unlock a particular reward or promotional offer (801). The goal and reward or promotional offer can be communicated to a server 702 (802). Server 702 can report back to the creator of the reward program the goal status for each user and further check whether a particular goal has been reached 703. If the goal is reached, then the reward or promotional offer is unlocked and made available to the user. The creator can indicate the promotional offer and/or reward and members of the program view the creator's set goal and the accompanying reward or promotional offer (803). The goal, for example, can be to refer other mobile users to subscribe to the same program. Existing members using an application running on a mobile device 705 can, for example, send SMS and/or email to unsubscribed users to help reach the goal and unlock the reward or promotional offer (804). The existing members can alternatively use a computer 706 to send a message or email to unsubscribed users. The unsubscribed users who actually register 707 can add to the potential of unlocking the reward or promotional offer (805). For example, a reward can be unlocked if a specific number of unregistered users end up subscribing for the program (806). For the users who reach the goal 708 the reward or promotional offer is distributed by the system 709 (807). According to aspects of the present invention the creator of the reward program can be a creator of particular content that users subscribe to.

Figure 9:
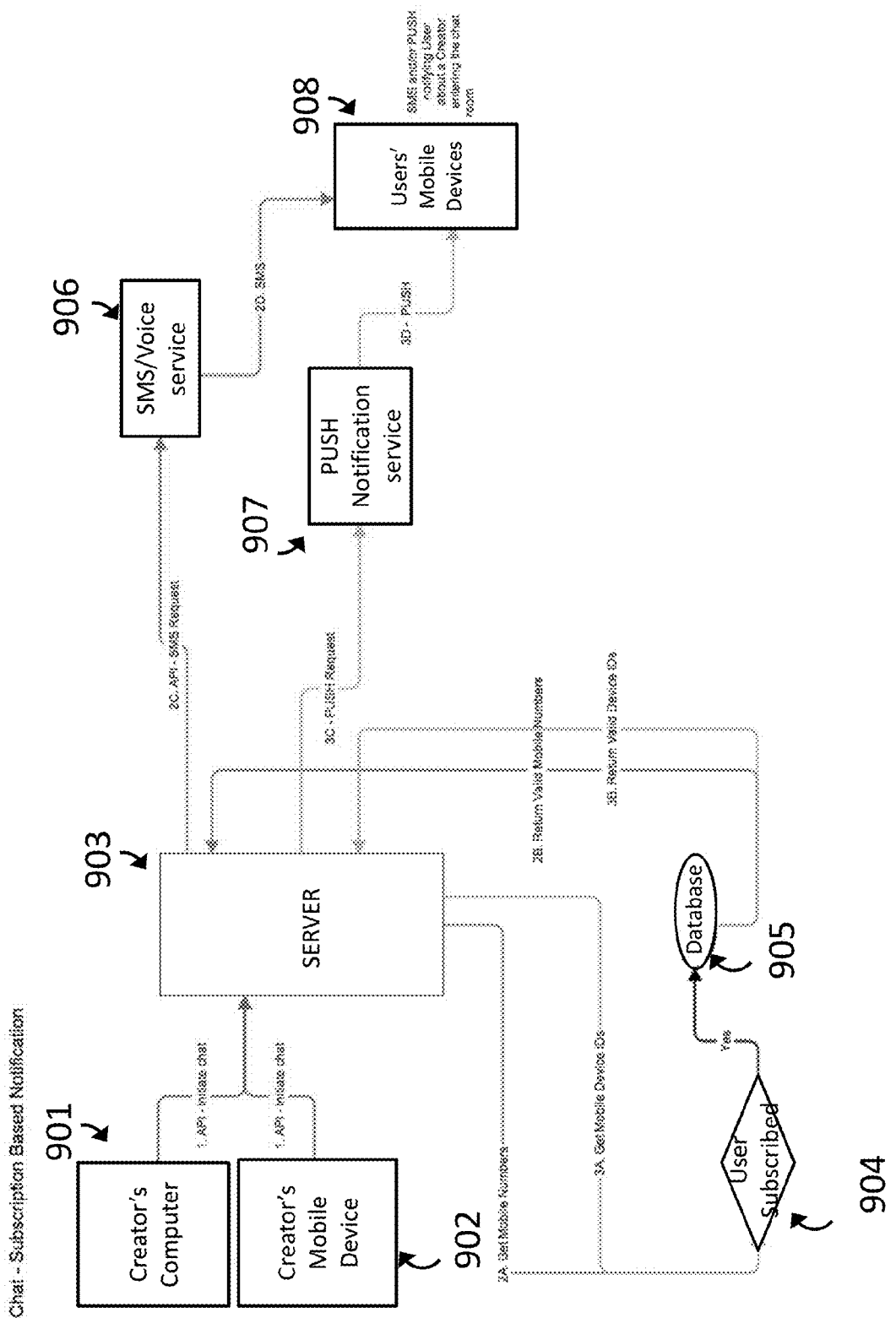
FIG. 9 shows a representative system for implementing subscription-based notifications for events in chat rooms according to aspects of the invention.
Figure 10:
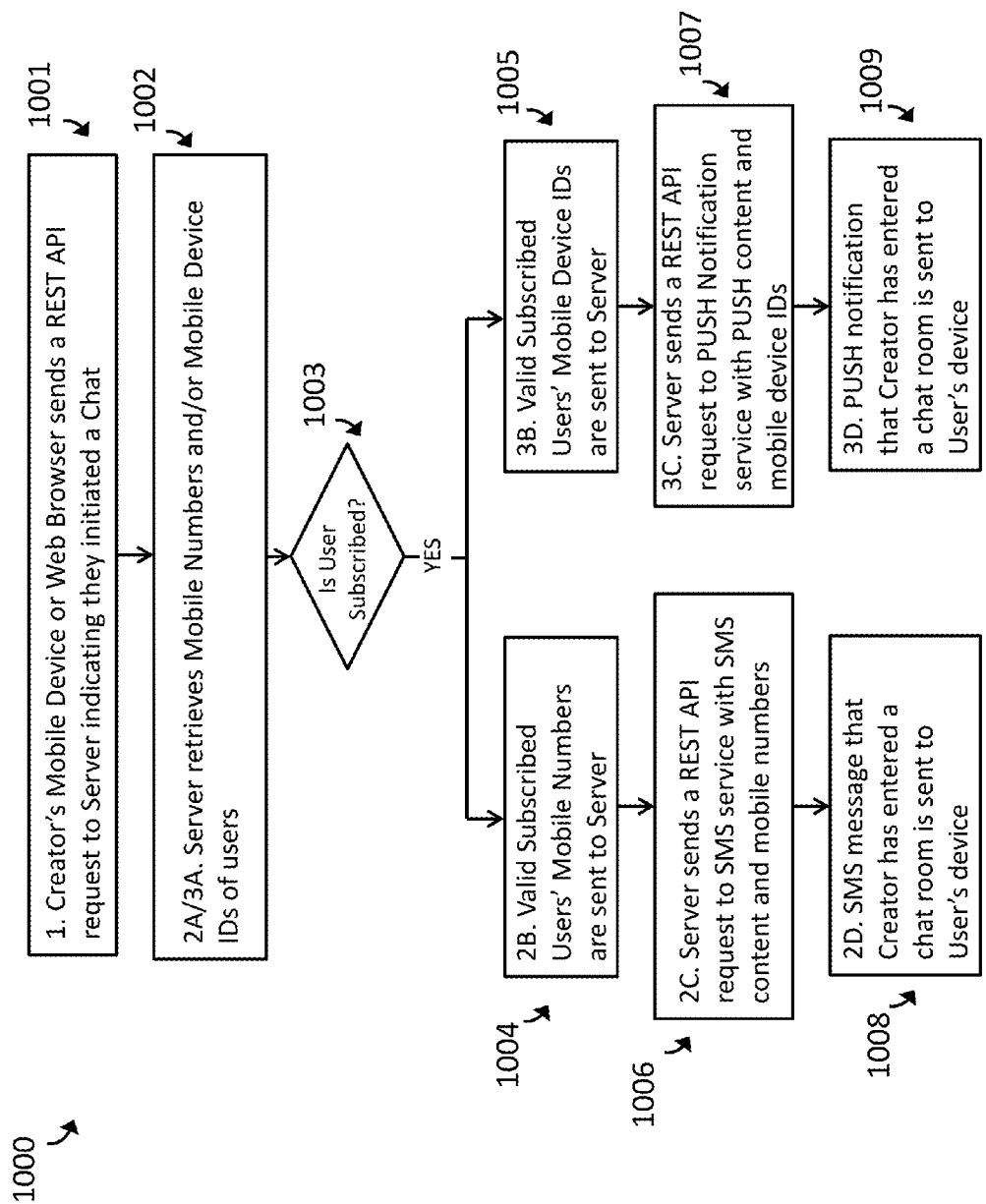
FIG. 10 shows a representative method for implementing subscription-based notifications for events in chat rooms according to aspects of the invention.

FIGS. 9 and 10 show an exemplary system 900 and method (1000), respectively, for notifying users about events on chat forums or rooms, for example, when a content creator enters a chat room or initiates a chat. A content creator can initiate a chat either on a computer 901 or a mobile device 902, using an application running on the computer or the mobile device. Using either the computer or the mobile device, the content creator app sends a REST API request to a server 903, indicating that the content creator initiated a chat (1001). The server 903 retrieves the mobile numbers and/or the mobile device IDs of all users of the media platform (1002). The server 903 checks whether the users are valid subscribers, i.e., whether they have subscribed to a particular service, for example, a chat service (1003). The server 903 retrieves from a database 905 the mobile numbers (1004) and/or the mobile device IDs (1005) of the valid subscribers. Then the server 903 can send a REST API request to an SMS service (1006). The API request sent to the SMS service 906 includes mobile numbers of the valid subscribers. The API request can also include content, for example, a message including the name of the content creator, that will be sent to the valid subscribers' mobile devices 908, as part of the SMS message (1008).

The server 903 can also send a REST API request to PUSH Notification service 907 (1007). The API request sent to the PUSH Notification service 907 includes mobile device IDs of the valid subscribers. The API request can also include content, for example, a message including the name of the content creator, that will be sent to the valid subscribers' mobile devices 908 as part of the PUSH Notification (1009).

Figure 11:
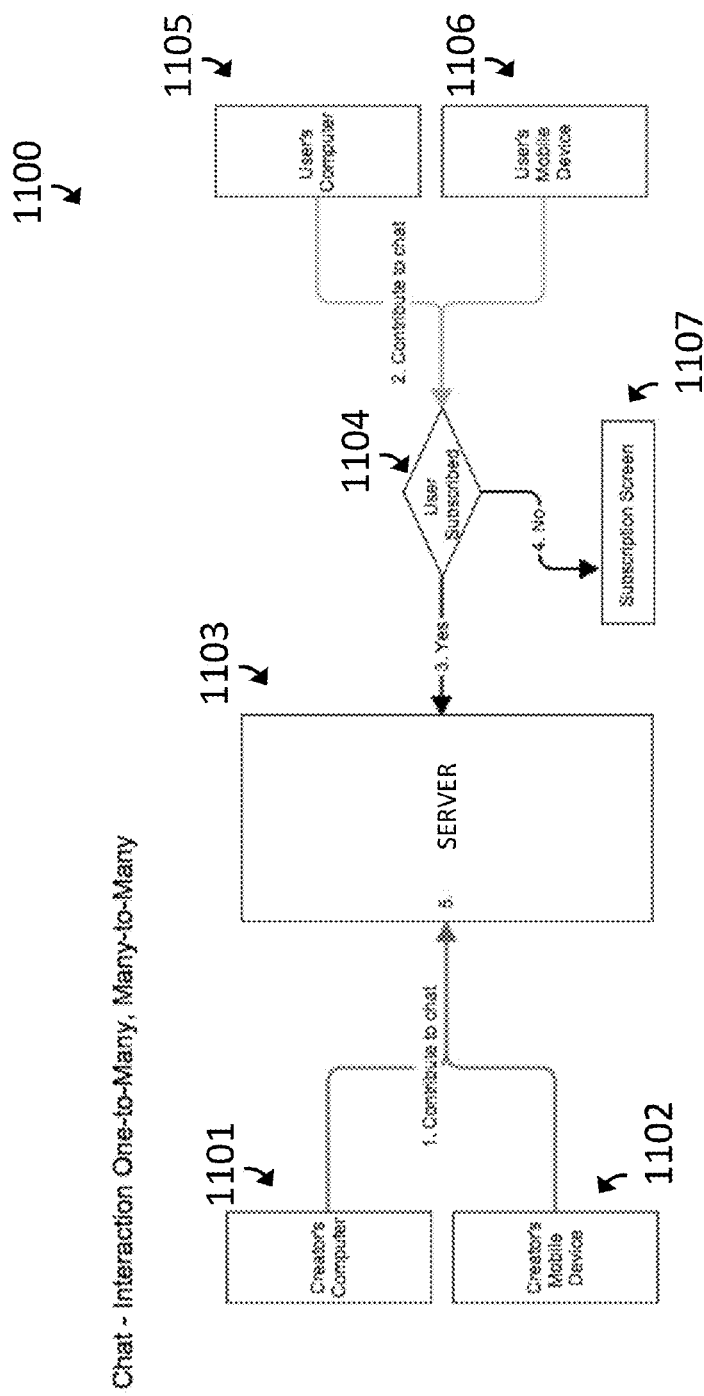
FIG. 11 shows a representative system for implementing subscription-based chat interactions according to aspects of the invention.
Figure 12:
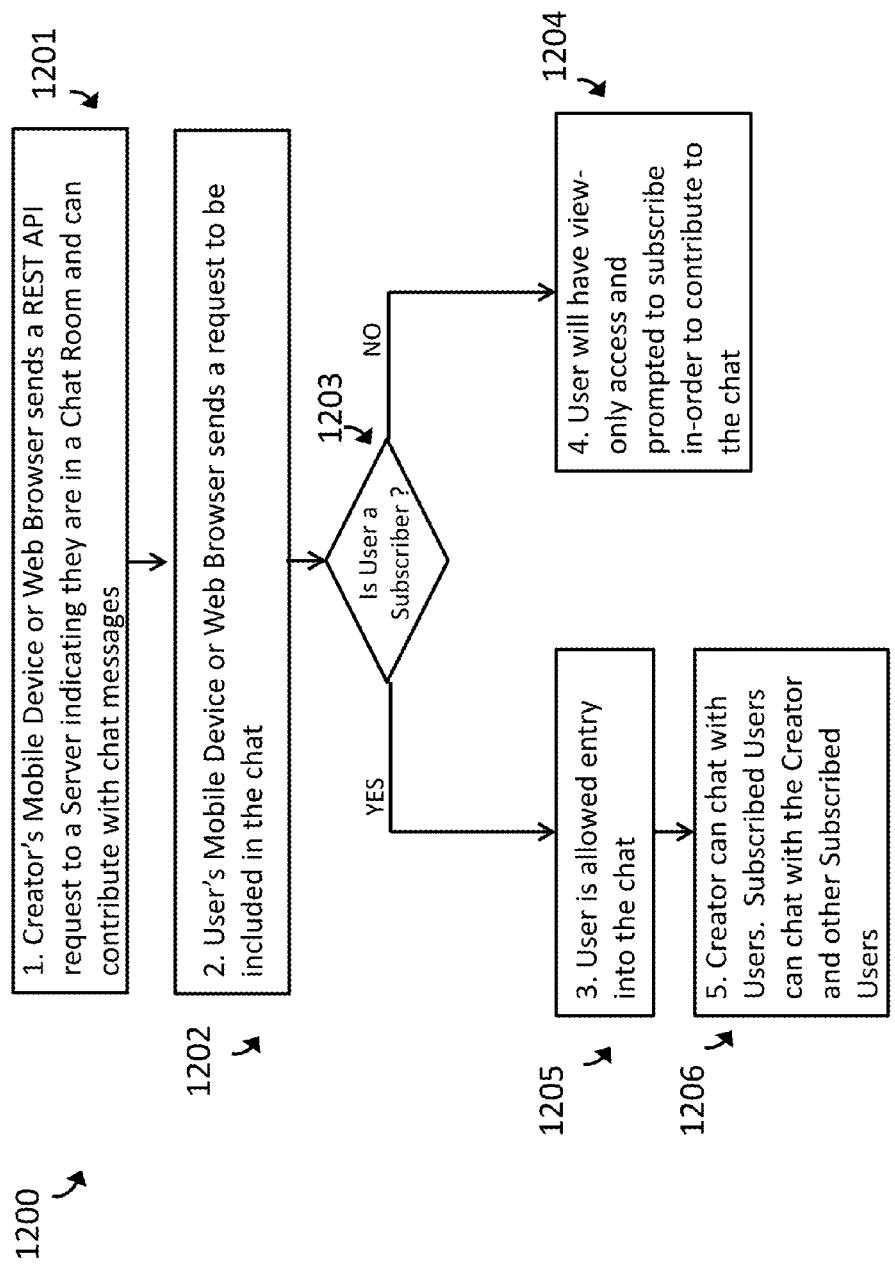
FIG. 12 shows a representative method for implementing subscription-based chat interactions according to aspects of the invention.

FIGS. 11 and 12 show an exemplary system 1100 and method (1200), respectively, for enabling chat interaction, for example, between different users or between a single user and many users. Using either the computer 1101 or the mobile device 1102, the content creator app sends a REST API request to a server 1103, indicating that the content creator can send chat messages (1201). Users can use computers 1105 and/or mobile devices 1106 to send a request to participate in the chat (1202). The system checks whether the users who requested to participate in the chat have subscribed to the service 1104 (1203). The system allows the subscribed users to enter the chat (1205). Subscribed users can communicate with the creator and/or other users and the creator can communicate with the subscribed users (1206).

Users who send requests to participate in the chat and have not subscribed to the service have view-only access to the chat (1204). In addition to view-only access to the chat, the system also provides a subscription-related screen 1107 that prompts the users to subscribe to the service if they want to participate in the chat (1204).

Figure 13:
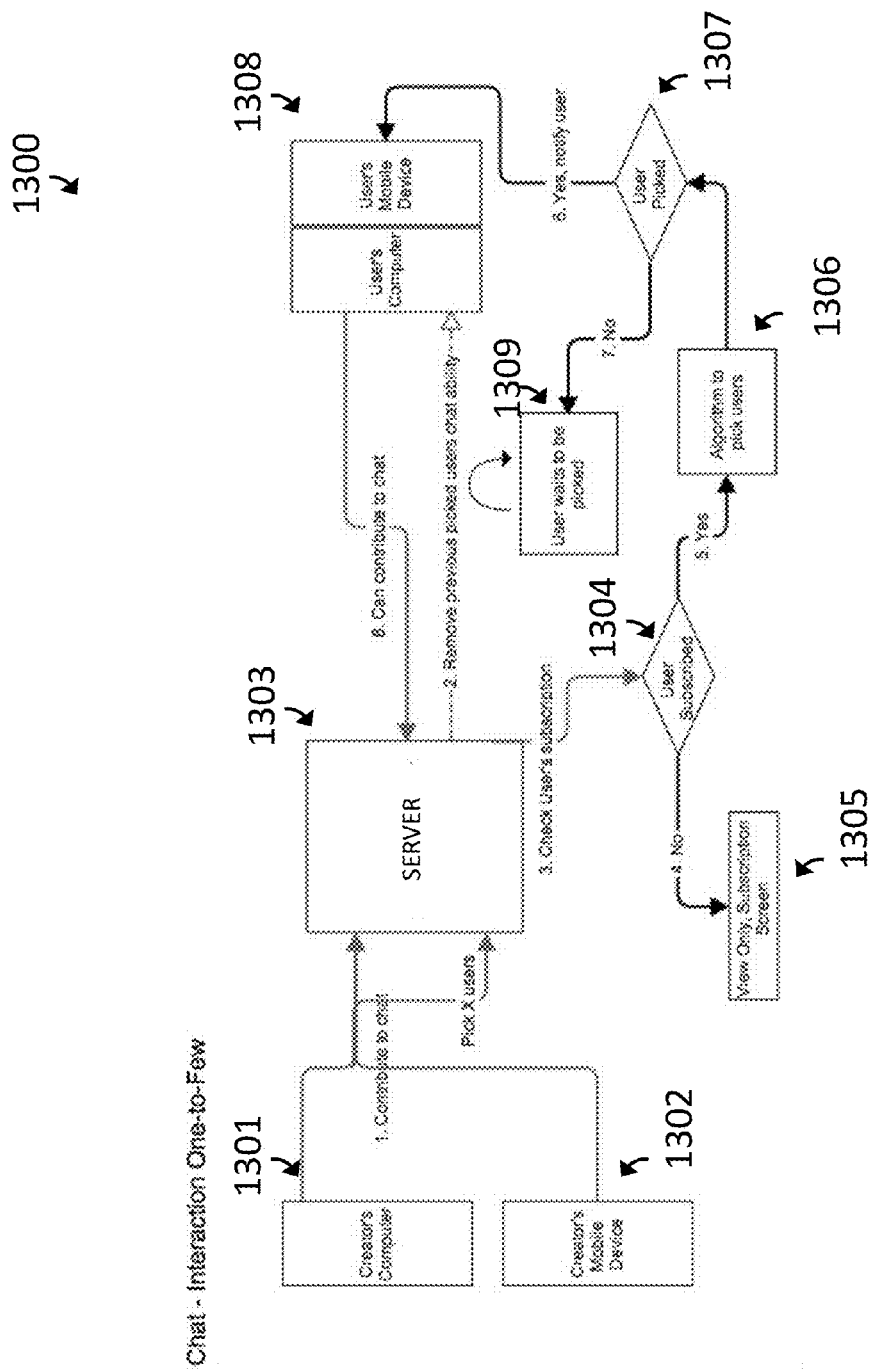
FIG. 13 shows a representative system for implementing subscription-based chat interactions according to aspects of the invention.
Figure 14:
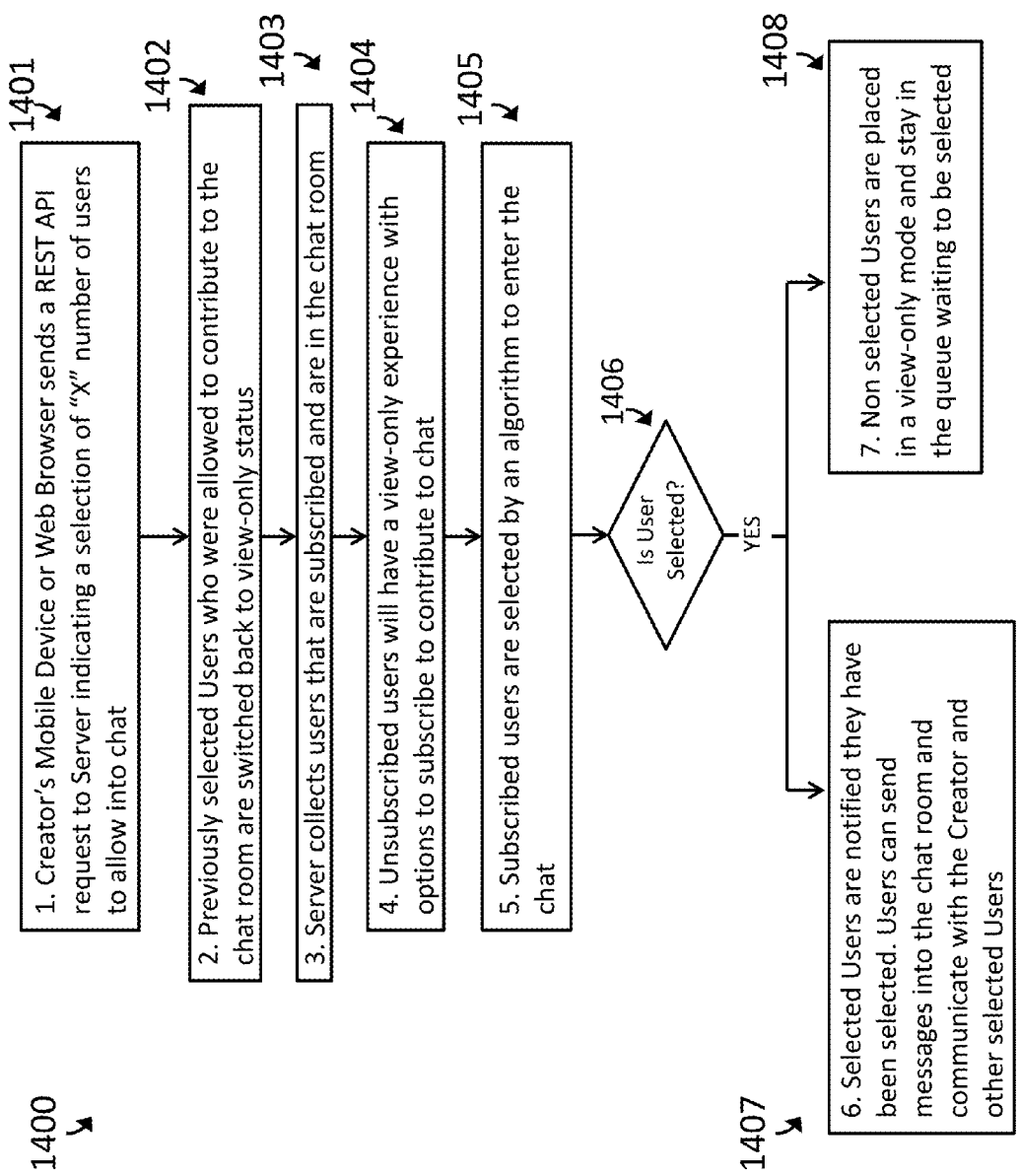
FIG. 14 shows a representative method for implementing subscription-based chat interactions according to aspects of the invention.

FIGS. 13 and 14 show an exemplary system 1300 and method (1400), respectively, for enabling chat interaction, for example, between a single user and particular number of users. Using either a computer 1301 or a mobile device 1302, the content creator app sends a REST API request to a server 1303, indicating that the content creator has selected a number of "X" users to enter a chat room with the content creator (1401). Subscribed users who had been previously selected to participate in the chat, for example, using the methods described in connection with FIG. 12, are switched to view-only users (1402).

Server 1303 can collect information about the subscribed users 1304 who have participated in the chat with the content creator (1403). The system allows unsubscribed users to have view-only access to the chat and provides options to those users to subscribe to the service (1404).

The system can implement an algorithm 1306 to select the "X" number of users among the subscribed users who can participate in the chat with the content creator (1405). A person of ordinary skill would understand that different algorithms can be used to select a number of users from the subscribed users. For example, a First-In-First-Out (FIFO) algorithm adds users to a queue to be selected for chat as they enter the room. When the content creator selects "X" number of users to communicate in the chat room, the algorithm can pick the first "X" number of users from the front of the queue, can enable them to chat in the room, and then place them in the back of the line for re-selection. The FIFO algorithm favors subscribed users who have been waiting to be selected more than subscribed users that had more recently entered the chat room. Alternatively, another algorithm selects a random set of "X" number of users based on the "Fisher-Yates" algorithm. The "Fisher-Yates" algorithm shuffles the users in the chat room, then selects the "X" number of users from the top of the queue after the shuffle has been performed. This algorithm provides to users equal probability for being selected. According to a "Small Limit" algorithm, if the number of subscribed users is less than a threshold, the selection process will choose all subscribed users. The disclosed system and method can check whether a particular subscribed user has been selected 1307 (1406). Non-selected users can be placed in a view-only mode and can stay in a queue waiting to be selected 1309 (1408). The selected users are notified that they can send messages into the chat room and communicate with the content creator and other selected users (1407).

The descriptions herein are applicable in any computing or processing environment. Embodiments of the disclosed subject matter can be implemented in computer hardware, firmware, and/or computer programs executing on programmable computers, mobile devices, or servers that each includes a processor and a storage medium readable by the processor (including volatile and non-volatile memory and/or storage elements). A "server," "client," "agent," "module," "interface," and "host" is not software per se and includes at least some tangible, non-transitory hardware that is configured to execute computer readable instructions.

Any computer program can be implemented in a high-level procedural or object-oriented programming language to communicate within and outside of computer-based systems. Any computer program can be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, can also be implemented as a machine-readable storage medium, configured with a computer program, where, upon execution, instructions in the computer program cause a machine to operate to perform the functions of the embodiments described above. The embodiments, or portions thereof, may be implemented using circuitry, such as one or more of programmable logic (e.g., an ASIC), logic gates, a processor, and a memory. While several particular forms of the disclosed subject matter have been described, it will be apparent that various modifications are possible. It is not intended that the disclosed subject matter be limited to the particular embodiments described here. Other advantages and novel features of the disclosed subject matter may become apparent from the detailed description when considered in conjunction with the drawings Embodiments of the disclosed subject matter can be used in a variety of applications. Although the embodiments, or portions thereof, are not limited in this respect, the embodiments, or portions thereof, can be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above can also be implemented using integrated circuit blocks referred to as main memory, cache memory, or other types of memory that store electronic instructions to be executed by a microprocessor or store data that may be used in arithmetic operations.

It is particularly noted that the persons skilled in the art can readily combine the various technical aspects of the various exemplary embodiments described as well as their constituent elements and sub-systems to implement features and processes contemplated to be within the scope of the disclosed subject matter but not literally or explicitly described.

It is to be understood that the disclosed subject matter is not limited in its application to the details of construction and to the arrangements of the components set forth in this description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Various modifications to the disclosed embodiments will be apparent to those skilled in the art, and the general principals set forth below may be applied to other embodiments and applications. Thus, the present invention is not intended to be limited to the embodiments shown or described herein.

What is claimed is:

1. A method for implementing a subscription-based social media platform comprising the steps of:
    a server receiving from at least one of a computer and a mobile device of a content creator, a first REpresentational State Transfer (REST) application programming interface (API) request for initiating a chat, the API request generated by an application running on the at least one of a computer and a mobile device of the content creator;
    the server determining a plurality of subscribers from users of the social media platform;
    the server retrieving from a database information about the plurality of subscribers; and
    the server:
        (a) sending to an SMS message service provider a second REST API request, information about the plurality of subscribers, and SMS content from the content creator, if the second REST API request is a request to an SMS message service provider; and
        (b) sending to a PUSH Notification service provider a third REST API request, information about the plurality of subscribers, and PUSH Notification content from the content creator, if the third REST API request is a request for a PUSH Notification.

2. The method of claim 1, wherein the information about the plurality of subscribers comprises at least one of mobile numbers and mobile device IDs of valid subscribers.

3. The method of claim 1, further comprising sending an SMS message to the subscribers.

4. The method of claim 1, further comprising sending a PUSH Notification to the subscribers.

5. A method for implementing a subscription-based social media platform comprising the steps of:
    a server receiving from at least one of a computer and a mobile device of a content creator, a REST API request, the API request generated by an application running on the at least one of a computer and a mobile device of the content creator and indicating that the content creator can participate in a chat;
    the server determining whether a user is a subscribed user, in response to at least one request by a user to participate in the chat; and
    the server:
        (a) enabling the user to participate in the chat, if the user is a subscribed user; and
        (b) enabling the user to have view-only access to the chat, if the user is not a subscribed user.

6. The method of claim 5, wherein the user can participate in the chat by sending a chat message to the content creator.

7. The method of claim 5, wherein the user can participate in the chat by sending a chat message to other subscribed users.

8. The method of claim 5, the server further prompting the user to subscribe to a service if the user is not a subscribed user.

9. A method for implementing a subscription-based social media platform comprising the steps of:
    a server receiving from at least one of a computer and a mobile device of a content creator, a REST API request, the API request generated by an application running on the at least one of a computer and a mobile device of the content creator and indicating a first number, wherein the first number is a number of users of the social media platform that can enter a chat room with the content creator;

the server determining whether the users of the social media platform that have indicated interest to enter the chat room are subscribed users, in response to indicated interest by the users to enter the chat room with the content creator; and the server:
- (a) selecting, among the subscribed users, the first number of users to enter the chat room; and
- (b) enabling the users that are not subscribed to have view-only access to the chat room.

10. The method of claim 9, further comprising placing the subscribed users that are not selected into a queue.

11. The method of claim 9, wherein selecting the first number of users comprises selecting the users according to a First-In-First-Out algorithm.

12. The method of claim 9, wherein selecting the first number of users comprises selecting the users according to a Fisher-Yates algorithm.

13. The method of claim 9, wherein selecting the first number of users comprises selecting all subscribed users, if a number of subscribed users that have indicated interest to enter the chat room is less than a threshold number.

* * * * *